(12) United States Patent
Nakamura et al.

(10) Patent No.: US 12,081,080 B2
(45) Date of Patent: Sep. 3, 2024

(54) DRIVE DEVICE

(71) Applicant: NIDEC CORPORATION, Kyoto (JP)

(72) Inventors: Keigo Nakamura, Kyoto (JP); Keisuke Fukunaga, Kyoto (JP); Shohei Fujimoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 263 days.

(21) Appl. No.: 17/692,176

(22) Filed: Mar. 11, 2022

(65) Prior Publication Data

US 2022/0294317 A1   Sep. 15, 2022

(30) Foreign Application Priority Data

Mar. 12, 2021  (JP) .................... 2021-040269

(51) Int. Cl.
| | |
|---|---|
| *H02K 11/33* | (2016.01) |
| *B60L 50/51* | (2019.01) |
| *H02K 7/00* | (2006.01) |
| *H02K 7/08* | (2006.01) |
| *H02K 7/116* | (2006.01) |

(52) U.S. Cl.
CPC .............. *H02K 11/33* (2016.01); *B60L 50/51* (2019.02); *H02K 7/006* (2013.01); *H02K 7/083* (2013.01); *H02K 7/116* (2013.01)

(58) Field of Classification Search
CPC ........ H02K 11/33; H02K 7/006; H02K 7/083; H02K 7/116; B60L 50/51

USPC .......................................................... 310/40
See application file for complete search history.

(56) References Cited

U.S. PATENT DOCUMENTS

| | | | | |
|---|---|---|---|---|
| 5,821,653 | A  * | 10/1998 | Kinto ....................... | B60K 1/00 |
| | | | | 310/58 |
| 11,079,004 | B2 | 8/2021 | Ishikawa et al. | |
| 2011/0039649 | A1* | 2/2011 | Tanae ..................... | B60K 6/365 |
| | | | | 475/5 |
| 2018/0076687 | A1* | 3/2018 | Pritchard ............... | H02K 11/33 |
| 2019/0178365 | A1* | 6/2019 | Ishikawa ............. | F16H 57/0493 |
| 2020/0403482 | A1 | 12/2020 | Luo et al. | |
| 2022/0081198 | A1* | 3/2022 | Büttner .................. | H02K 5/124 |

FOREIGN PATENT DOCUMENTS

JP          2020178481 A      10/2020

* cited by examiner

*Primary Examiner* — Terrance L Kenerly

(74) *Attorney, Agent, or Firm* — HAUPTMAN HAM, LLP

(57) ABSTRACT

A partition wall of a drive device has a first partition wall and a second partition wall. The first partition wall extends in a direction intersecting with an axial direction and covers one end portion of a motor housing in the axial direction. The second partition wall extends in a direction intersecting with the axial direction and is disposed on one side in the first direction perpendicular to the axial direction with respect to the first partition wall, and covers the other end portion of the gear housing in the axial direction together with the first partition wall. The second partition wall is disposed on one side in the axial direction with respect to the first partition wall.

12 Claims, 5 Drawing Sheets

DRIVE DEVICE

CROSS-REFERENCE TO RELATED APPLICATIONS

The present invention claims priority under 35 U.S.C. § 119 to Japanese Patent Application No. 2021-040269 filed on Mar. 12, 2021, the entire content of which is incorporated herein by reference.

FIELD OF THE INVENTION

The present invention relates to a drive device.

BACKGROUND

Conventionally, a drive device for reducing torque of a motor at a predetermined deceleration ratio and transmitting the torque to a drive shaft is known. For example, in a drive device, a motor, a transmission interlocking with the motor, and a controller are integrally configured.

By the way, in recent years, it has been required to dispose a drive device more compactly. For example, when the drive device is disposed on the rear side of an electric vehicle, it is required to reduce a size of the drive device in a vertical direction. In response to such demand, in the above-mentioned drive device, since a controller is disposed at an upper part of a transmission, it is difficult to reduce the size of the drive device in the vertical direction.

SUMMARY

An exemplary drive device of the present invention includes a motor portion, a gear portion, and a housing. The motor portion includes a rotor and a stator. The rotor has a motor shaft. The motor shaft is rotatable about a first rotation axis extending in the axial direction. The stator is disposed radially outward of the rotor. The gear portion is located at one end portion in the axial direction of the motor portion. The housing accommodates the motor portion and the gear portion. The gear portion includes a first shaft, second shaft, a first gear, a second gear, a third gear, and a fourth gear. The first shaft is connected to the motor shaft. The first gear is located on the radially outer surface of the first shaft. The second shaft extends along a second rotation axis extending in the axial direction. The second gear and the third gear are located on the radially outer surface of the first shaft extending in the axial direction, and are rotatable about the second rotation axis extending in the axial direction. The fourth gear is rotatable about a third rotation axis extending in the axial direction. The second gear is disposed on the other side in the axial direction with respect to the third gear and meshes with the first gear. The third gear meshes with the fourth gear. The pitch circle diameter of the second gear is larger than the pitch circle diameter of the third gear. The third rotation axis is disposed on one side in the first direction perpendicular to the axial direction with respect to the first rotation axis. The housing includes a motor housing, a gear housing, a partition wall, and an inverter housing. The motor housing has a tubular shape extending in the axial direction and accommodates the motor portion. The gear housing has a tubular shape extending in the axial direction and accommodates the gear portion. The partition wall separates the motor housing and the gear housing. The inverter housing accommodates an inverter unit that is electrically connected to the stator. The fourth gear is disposed on one side in the axial direction with respect to the inverter housing. The first rotation axis is disposed on the other side in the first direction with respect to the inverter housing. The third rotation axis is disposed on one side of the inverter housing in the axial direction and in the second direction perpendicular to the first direction. The partition wall has a first partition wall and a second partition wall. The first partition wall extends in a direction intersecting with the axial direction and covers one end portion of the motor housing in the axial direction. The second partition wall extends in a direction intersecting with the axial direction, is disposed on one side in the first direction with respect to the first partition wall, and covers the other end portion of the gear housing in the axial direction together with the first partition wall. The second partition wall is disposed on one side in the axial direction with respect to the first partition wall.

The above and other elements, features, steps, characteristics and advantages of the present disclosure will become more apparent from the following detailed description of the preferred embodiments with reference to the attached drawings.

DETAILED DESCRIPTION

Figure 1:
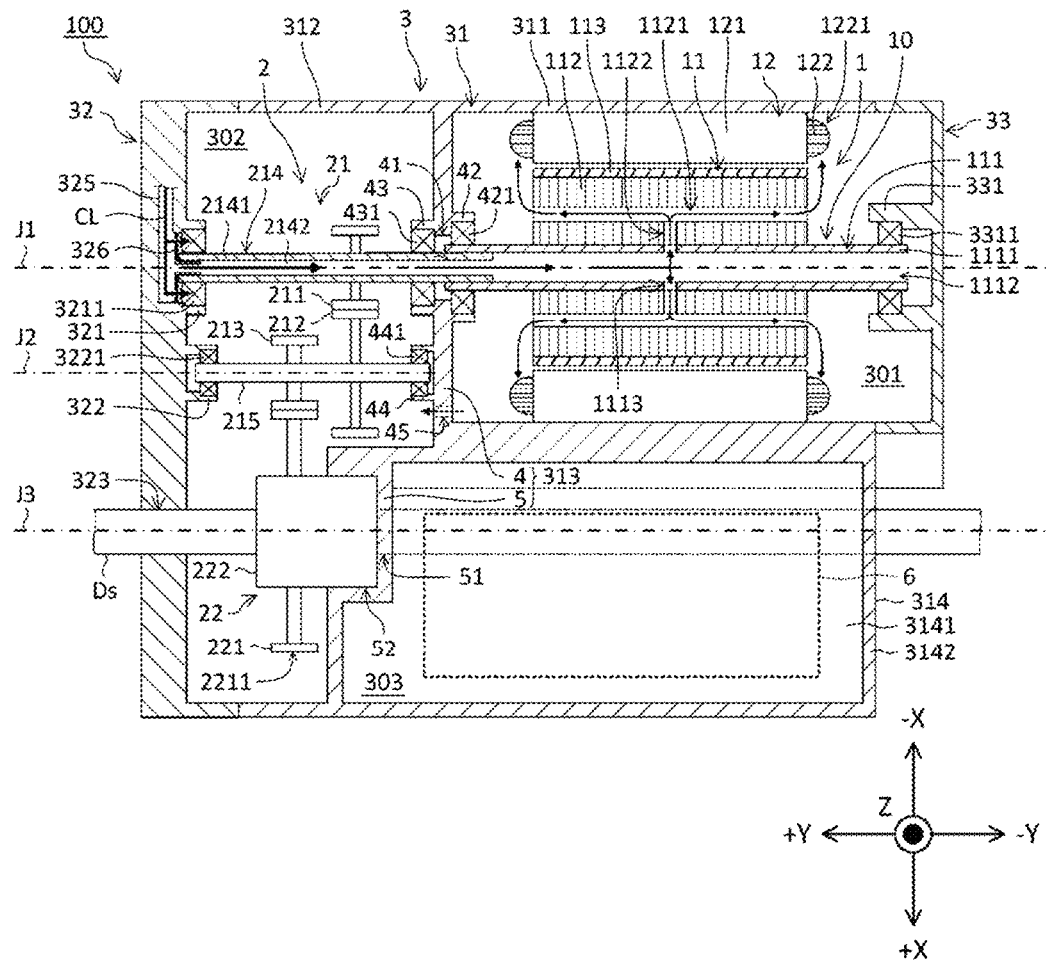
FIG. 1 is a schematic configuration view of a drive device viewed from a Z axis direction.

Hereinafter, exemplary embodiments will be described with reference to the drawings.

The following description will be made with the direction of gravity being defined based on a positional relationship in the case where a drive device 100 is mounted in a vehicle 200 located on a horizontal road surface. In addition, in the drawings, an xyz coordinate system is illustrated appropriately as a three-dimensional orthogonal coordinate system. In the XYZ coordinate system, the Z axis direction indicates the vertical direction (i.e., up-down direction). The +Z direction is upward (vertically upward opposite to the gravity direction), and the −Z direction is downward (vertically downward in the same direction as the gravity direction). The "Z axis direction" in the following description is an example of the "second direction" of the present invention. Further, "−Z direction" is an example of "one side in the second direction" of the present invention, and "+Z direction" is an example of "other side in the second direction" of the present invention.

The X axis direction is a direction orthogonal to the Z axis direction and shows the front-rear direction of the vehicle 200 in which the drive device 100 is mounted. The +X direction is the front of the vehicle 200, and the −X direction is the rear of the vehicle 200. However, the +X direction can be the rear of the vehicle 200, and the −X direction can be the front of the vehicle 200. The "X axis direction" in the following description is an example of the "first direction" of the present invention. Further, "+X direction" is an example of "one side in the first direction" of the present invention, and "−X direction" is an example of "other side in the first direction" of the present invention.

A Y axis direction is a direction orthogonal to both the X axis direction and the Z axis direction, and indicates a width direction (i.e., a left-right direction) of the vehicle 200. The −Y direction is to the left of the vehicle 200 and the +Y direction is to the right of the vehicle 200. However, when the +X direction is the rear of the vehicle 200, the +Y direction can be the left of the vehicle 200, and the −Y direction can be the right of the vehicle 200. That is, regardless of the X axis direction, the +Y direction simply becomes one side in the right-left direction of the vehicle 200, and the −Y direction becomes the other side in the right-left direction of the vehicle 200. Depending on a method for mounting the drive device 100 on the vehicle 200, the X axis direction can be the width direction (right-left direction) of the vehicle 200, and the Y axis direction can be the front-rear direction of the vehicle 200. In the following embodiment, the Y axis direction is parallel to, for example, a rotation axis J1 of a motor portion 1. The "Y axis direction" in the following description is an example of the "axial direction" of the present invention. Further, the "+Y direction" is an example of the "one side in the axial direction" of the present invention, and the "−Y direction" is an example of the "other side in the axial direction" of the present invention.

Unless otherwise specified in the following description, the direction (Y axis direction) parallel to a predetermined axis such as the rotation axis J1 of the motor portion 1 is sometimes simply referred to as an "axial direction". Furthermore, a direction orthogonal to a predetermined axis is simply referred to as a "radial direction", and a circumferential direction about a predetermined axis is referred to as a "circumferential direction". Of the radial direction, an orientation approaching an axis is referred to as "radially inward", and an orientation separating from the axis is referred to as "radially outward". In each component, an end portion radially inward is referred to as a "radially inner end portion". Furthermore, an end portion outward is referred to as a "radially outer end portion". Further, in side surfaces of each component, a side surface facing the radially inner side is referred to as a "radially inner surface", and a side surface facing the radially outer side is referred to as a "radially outer surface".

Note that, these terms are names used merely for description, and are not intended to limit actual positional relationships, directions, names, and the like.

In the above description, in a positional relationship between any one and another of azimuths, lines, and surfaces, "parallel" includes not only a state where the two endlessly extend without intersecting at all but also a state where the two are substantially parallel. Further, "orthogonal" and "perpendicular" include not only a state where the two intersect with each other at 90 degrees, but also a state where the two are substantially orthogonal and a state where the two are substantially perpendicular. That is, the terms "parallel", "perpendicular", and "orthogonal" each include a state in which the positional relationship between the two has an angular deviation that does not depart from the gist of the present invention.

Figure 2:
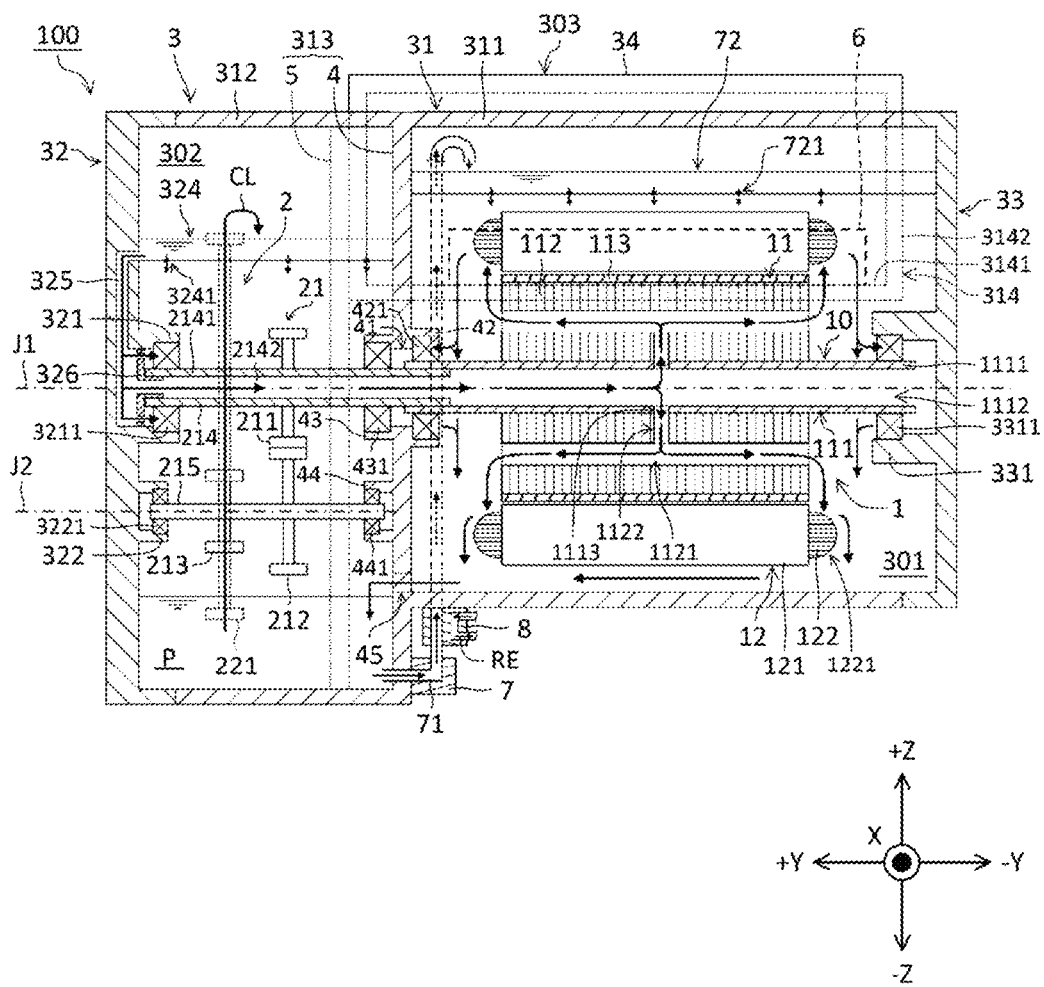
FIG. 2 is a schematic configuration view of the drive device viewed from an X axis direction.
Figure 3:
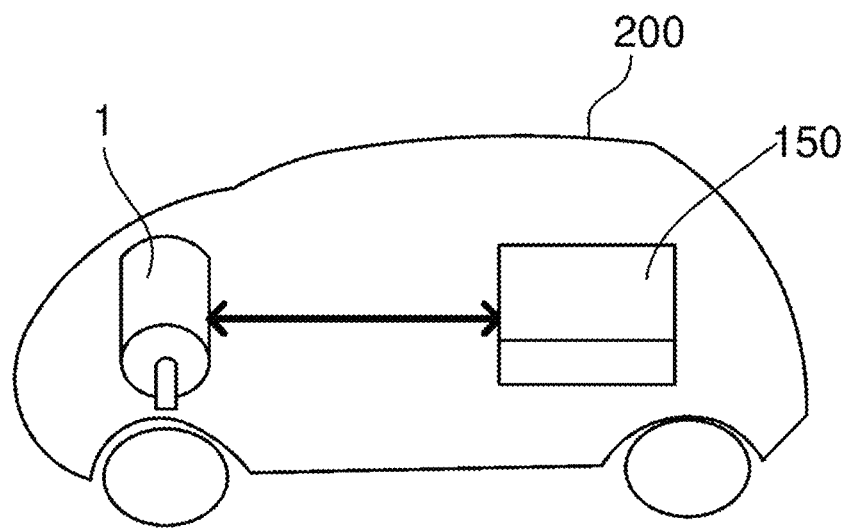
FIG. 3 is a schematic view showing an example of a vehicle including the drive device.

FIG. 1 is a schematic configuration view of the drive device 100 viewed from the Z axis direction. FIG. 2 is a schematic configuration view of the drive device 100 viewed from the X axis direction. FIG. 3 is a schematic view showing an example of the vehicle 200 having the drive device 100. Note that FIGS. 1 and 2 are merely conceptual views, and the layout and dimensions of each portion are not necessarily the same as those of the actual drive device 100.

The drive device 100 is mounted on the vehicle 200 such as a hybrid vehicle (HV), a plug-in hybrid vehicle (PHV), and an electric vehicle (EV) in which at least the motor is used as a power source (see FIG. 3). The drive device 100 is used as the power source of the above-described vehicle 200. The vehicle 200 includes the drive device 100 and a battery 150. The battery 150 stores electric power to be supplied to the drive device 100. In the example of the vehicle 200, the drive device 100 drives the right and left front wheels. The drive device 100 is only required to drive at least any of the wheels.

The drive device 100 includes an output shaft 10. The output shaft 10 extends along the rotation axis J1 extending in the Y axis direction, and is rotatable about the rotation axis J1. The output shaft 10 is composed of a motor shaft 111 and a first shaft 214. Further, the drive device 100 includes the motor portion 1, a gear portion 2, and a housing 3. The motor portion 1 includes a rotor 11 and a stator 12. The rotor 11 has the motor shaft 111. The motor shaft 111 is rotatable about the rotation axis J1 extending in the Y axis direction. Note that the rotation axis J1 is an example of a "first rotation axis" of the present invention. The stator 12 is disposed radially outward of the rotor 11. The gear portion 2 is located at the end portion of the motor portion 1 on the +Y direction side. The housing 3 accommodates the motor portion 1 and the gear portion 2.

Further, the drive device 100 further includes an inverter unit 6, a pump 7, and an oil cooler 8. The inverter unit 6 supplies drive electric power to the motor portion 1. The pump 7 supplies an oil CL stored in the housing 3 to the motor portion 1. The oil cooler 8 cools the oil CL.

The inside of the housing 3 is provided with an accommodation space that accommodates the motor portion 1, the gear portion 2, the pump 7, and the inverter unit 6. This accommodation space is divided into a motor accommodation portion 301, a gear accommodation portion 302, and an inverter accommodation portion 303. In other words, the housing 3 has the motor accommodation portion 301, the gear accommodation portion 302, and the inverter accommodation portion 303. The motor accommodation portion 301 accommodates the motor portion 1. The gear accommodation portion 302 accommodates the gear portion 2. At the lower part of the gear accommodation portion 302 in the vertical direction, there is an oil pool P in which the oil CL is accumulated. The motor accommodation portion 301 and the gear accommodation portion 302 are partitioned by a partition wall 313. The inverter accommodation portion 303 accommodates the inverter unit 6.

Next, the motor portion 1 will be described with reference to FIGS. 1 and 2.

When electric power is supplied from a battery (not illustrated) to the stator 12, the rotor 11 rotates about the rotation axis J1 extending in the horizontal direction. In this embodiment, the rotation axis J1 is disposed on the −X direction side with respect to an inverter housing 314.

As described above, the rotor 11 has the motor shaft 111. The motor shaft 111 extends along the rotation axis J1. The hollow first shaft 214, which will be described later, is inserted and connected to the end portion of the motor shaft 111 on the +Y direction side. In the present embodiment, the both are connected by spline fitting. However, the present invention is not limited to the example, and both may be connected by a screw coupling using a male screw and a female screw, or may be joined by a fixing method such as welding.

The motor shaft 111 is a tubular hollow shaft. The motor shaft 111 includes a shaft tubular portion 1111, a hollow portion 1112, and a shaft hole portion 1113. The shaft tubular portion 1111 has a tubular shape extending in the Y axis direction. The hollow portion 1112 communicates with a hollow portion 2142 to be described later of the first shaft 214 at the end portion of the shaft tubular portion 1111 on the +Y direction side, and is connected to a gear side oil passage 325 to be described later via the hollow portion 2142. The shaft hole portion 1113 penetrates the shaft tubular portion 1111 in the radial direction.

The rotor 11 further has a rotor core 112 and a magnet 113. The rotor core 112 is a columnar body extending along the Y axis direction. The rotor core 112 is fixed to the radially outer surface of the motor shaft 111. A plurality of magnets 113 are fixed to the radially outer end portions of the rotor core 112. The plurality of magnets 113 are disposed along the circumferential direction with magnetic poles disposed alternately.

The rotor core 112 includes a rotor through hole 1121 and a rotor communication portion 1122. The rotor through hole 1121 penetrates the rotor core 112 in the Y axis direction and is connected to the shaft hole portion 1113. The rotor through hole 1121 is connected to the gear side oil passage 325 via the hollow portion 1112 and the hollow portion 2142. The rotor communication portion 1122 is a space penetrating the rotor through hole 1121 from the radially inner surface of the rotor core 112, and connects the rotor through hole 1121 to the shaft hole portion 1113. The rotor through hole 1121 is used as a circulation path for the oil CL that cools the rotor 11 from inside. The oil CL circulating through the hollow portion 1112 of the motor shaft 111 can flow into the rotor through hole 1121 via the shaft hole portion 1113 and the rotor communication portion 1122 as will be described later. In this way, as the rotor 11 rotates, the oil CL flows out from both end portions of the rotor through hole 1121 in the Y axis direction. This oil CL is supplied to the end of the stator 12 in the Y axis direction by centrifugal force due to the rotation of the rotor 11, and is particularly supplied to the coil end 1221 to be described later, which is disposed at the end portion of the stator 12 in the Y axis direction. This oil CL can cool the end portion of the stator 12 in the Y axis direction, especially the coil end 1221 of the stator 12.

The stator 12 surrounds the rotor 11 from the outside in the radial direction and drives the rotor 11 to rotate. The stator 12 is held by the housing 3. As described above, the stator 12 is disposed radially outward of the rotor 11. That is, the motor portion 1 is an inner rotor motor in which the rotor 11 is disposed inside the stator 12 so as to be rotatable.

The stator 12 includes a stator core 121, a coil 122, and an insulator (not illustrated) disposed between the stator core 121 and the coil 122. The stator core 121 has a plurality of magnetic pole teeth (not illustrated) on the inward side in the radial direction. A coil wire is wound between the magnetic pole teeth. The coil wire wound around the magnetic pole teeth constitutes the coil 122. The coil wire is connected to the inverter unit 6 via a bus bar (not illustrated). The coil 122 includes the coil end 1221 protruding from the end surface of the Y axis direction of the stator core 121. The coil end 1221 protrudes outward from the end portion of the rotor core 112 of the rotor 11 in the Y axis direction.

Next, the gear portion 2 will be described with reference to FIGS. 1 and 2. The gear portion 2 transmits the driving force of the motor portion 1 to a drive shaft Ds that drives the wheels of the vehicle 200. The gear portion 2 has a deceleration device 21 and a differential device 22.

The deceleration device 21 is connected to the end portion of the motor shaft 111 on the +Y direction side. The deceleration device 21 reduces the rotational speed of the motor portion 1, increases the torque output from the motor portion 1 according to the deceleration ratio, and transmits the torque to the differential device 22.

The deceleration device 21 includes a first gear (intermediate drive gear) 211, a second gear (intermediate gear) 212, a third gear (final drive gear) 213, and the first shaft 214. In other words, the gear portion 2 includes the first shaft 214, the first gear 211, the second gear 212, and the third gear 213. The first shaft 214 is connected to the motor shaft 111. The first gear 211 is located in the radially outer surface of the first shaft 214. The second gear 212 and the third gear 213 are located on the radially outer surface of the second shaft 215 extending in the Y axis direction, and are rotatable about an intermediate axis J2 extending in the Y axis direction. Note that the intermediate axis J2 is an example of a "second rotation axis" of the present invention. Further, the deceleration device 21 further includes a second shaft 215. The second shaft 215 extends along the intermediate axis J2. The gear portion 2 further includes the second shaft 215. The second gear 212 and the third gear 213 are located on the radially outer surface of the second shaft 215.

The torque output from the motor portion 1 is transmitted to a fourth gear 221 to be described later of the differential device 22 via the motor shaft 111, the first shaft 214, the first gear 211, the second gear 212, the second shaft 215, and the third gear 213. In this manner, the deceleration device 21 transmits, to the differential device 22, the torque output from the motor portion 1. The gear ratio of each gear, the number of gears, and the like can be variously changed according to the required deceleration ratio. The deceleration device 21 is a speed reducer of a parallel-axis gearing type, in which center axes of gears are disposed in parallel with each other.

The first shaft 214 extends in the Y axis direction about the rotation axis J1 and rotates about the rotation axis J1 together with the motor shaft 111. The first shaft 214 is a tubular hollow shaft. The first shaft 214 has a shaft tubular portion 2141 and the hollow portion 2142. The shaft tubular portion 2141 is a tubular shape extending in the Y axis direction. The hollow portion 2142 is surrounded by the inner side surface of the shaft tubular portion 2141 and is connected to the gear side oil passage 325 to be described later at the end portion of the shaft tubular portion 2141 on the +Y direction side. The end portion of the shaft tubular portion 2141 on the −Y direction side is connected to the end portion of the motor shaft 111 on the +Y direction side.

Note that the present invention is not limited to the example of the present embodiment, and the first shaft 214 may be the same member as the motor shaft 111, that is, may be integrated. In other words, the output shaft 10 may be a single hollow shaft, and extend across the motor accommodation portion 301 and the gear accommodation portion 302. In this case, the end portion of the output shaft 10 on the +Y direction side protrudes toward the gear accommodation portion 302 and is rotatably supported by a second gear bearing holding portion 321 via a second gear bearing 3211. Further, the inside of the output shaft 10 communicates with a second motor bearing holding portion 331 and the second gear bearing holding portion 321.

The first gear 211 is disposed on the radially outer surface of the first shaft 214. The first gear 211 is rotatable about the rotation axis J1 together with the first shaft 214. The first gear 211 may be the same member as or a different member from the first shaft 214. When the first gear 211 and the first shaft 214 are separate members, the first gear 211 and the first shaft 214 are firmly fixed by shrink fitting or the like.

The second gear 212 and the third gear 213 are connected to each other via the second shaft 215. The second gear 212 and the third gear 213 are rotatable about the intermediate axis J2. The second gear 212 is disposed on the −Y direction side with respect to the third gear 213 and meshes with the first gear 211. The third gear 213 meshes with the fourth gear 221 to be described later. The pitch circle diameter of the second gear 212 is larger than the pitch circle diameter of the third gear 213. The second gear 212 and the third gear 213 each may be the same members as or different members from the second shaft 215. When at least one of the second gear 212 and the third gear 213 are made of members different from that of the second shaft 215, both are firmly fixed by shrink fitting or the like.

The second shaft 215 extends along the intermediate axis J2. The intermediate axis J2 is parallel to the rotation axis J1 and extends in the Y axis direction. The end portion of the second shaft 215 on the −Y direction side is rotatably supported by the partition wall 313 of the housing 3. The end portion of the second shaft 215 on the +Y direction side is rotatably supported by a first lid portion 32.

The intermediate axis J2 is disposed on the −Z direction side with respect to the rotation axis J1. Further, the intermediate axis J2 is disposed on the −Z direction side with respect to the differential axis J3 to be described later. By doing so, the second gear 212 that is rotatable around the intermediate axis J2 can be disposed on the −Z direction side, so that it is possible to prevent that the second gear 212 interferes with the arrangement of the inverter housing 314 in the Z axis direction. Therefore, the inverter housing 314 can be disposed on the −Z direction side. Therefore, the size of the drive device 100 in the Z axis direction can be made smaller, and the drive device 100 can be made more compact.

Further, by disposing the intermediate axis J2 as described above, the differential axis J3 can be brought closer to the rotation axis J1 in the X axis direction. Therefore, the size of the drive device 100 in the X axis direction can be reduced.

Further, the intermediate axis J2 is disposed on the −Z direction side perpendicular to the Y axis direction and the X axis direction with respect to the inverter housing 314. The −Z direction is one side in the Z axis direction and is perpendicular to the Y axis direction and the X axis direction. Since the intermediate axis J2 of the second shaft 215 is disposed on the −Z direction side with respect to both the rotation axis J1 of the output shaft 10 and the differential axis J3 of the fourth gear 221, the gap between the output shaft 10 and the fourth gear 221 can be made shorter in the X axis direction. Therefore, the gear accommodation portion 302 accommodating the gear portion 2 can be made more compact in the X axis direction. Therefore, the drive device 100 can be miniaturized.

The differential device 22 is attached to the drive shaft Ds. The gear portion 2 includes the drive shaft Ds and the differential device 22. The drive shaft Ds extends in the Y axis direction from the differential device 22. The differential device 22 transmits the torque of the motor portion 1 to the drive shafts Ds. The drive shafts Ds are disposed on the +Y direction side and the −Y direction side of the differential device 22, respectively. The left and right wheels of the vehicle 200 are attached to each drive shaft Ds. The differential device 22 transmits the torque to the left and right drive shafts Ds while absorbing a difference in rotational speed between the left and right wheels (drive shafts Ds) when, for example, the vehicle 200 is turning.

The drive shaft Ds is located on the −Z direction side with respect to the inverter housing 314. In this way, the drive shaft Ds can be prevented from interfering with the arrangement of the inverter housing 314 in the Z axis direction.

The differential device 22 includes the fourth gear 221, a differential device case 222, a pair of pinion gears (not illustrated), a pinion shaft (not illustrated), and a pair of side gears (not illustrated).

The fourth gear 221 is a ring gear of the differential device 22. The fourth gear 221 has a plurality of teeth 2211. The plurality of teeth 2211 are disposed at the radially outer end portion of the fourth gear 221 and are arranged in the circumferential direction. The teeth 2211 mesh with the teeth of the third gear 213. The teeth 2211 are located in the −Y direction from the end portion of the differential device 22 on the +Y direction side, and are located in the +Y direction with respect to the end portion of the differential device 22 on the −Y direction side. In the Y axis direction, the gap between the end portion of the teeth 2211 of the fourth gear 221 in the −Y direction and the end portion of the differential device 22 in the −Y direction is wider than the gap between the end portion of the teeth 2211 in the +Y direction and the end portion of the differential device 22 in the +Y direction. In this way, the differential device 22 can be disposed closer to the −Y direction side (that is, the side opposite to the first lid portion 32 in the Y axis direction) with respect to the fourth gear 221. Therefore, the space occupied by the differential device 22 on the +Y direction side with respect to the fourth gear 221 can be made smaller. Therefore, the size of the drive device 100 in the Y axis direction can be made smaller.

Preferably, when viewed in the X axis direction, at least a part of the second gear 212 overlaps with the differential device 22. By doing so, the −Y direction side of the differential device 22 can be disposed at the lower part of the second gear 212, so that the differential device 22 can be disposed further closer in the −Y direction. Therefore, the size of the drive device 100 in the Y axis direction can be made smaller.

The fourth gear 221 is disposed on the +Y direction side with respect to the inverter housing 314. The gear portion 2 includes the fourth gear 221. The fourth gear 221 is rotatable about the differential axis J3 extending in the Y axis direction. Note that the differential axis J3 is an example of a "third rotation axis" of the present invention. The differential axis J3 is disposed on one side (+X direction in this embodiment) of the X axis direction perpendicular to the Y axis direction with respect to the rotation axis J1. The torque output from the motor portion 1 is transmitted to the fourth gear 221 via the deceleration device 21. The differential device 22 transmits the torque of the fourth gear 221 to the drive shaft Ds.

Further, the lower portion of the fourth gear 221 (that is, the portion on the −Z direction side) is immersed in the lower oil pool P in the gear accommodation portion 302. For example, the oil CL is scraped up by the teeth surface of the fourth gear 221 when the fourth gear 221 of the differential device 22 rotates. A part of the oil is supplied to the inside of the gear accommodation portion 302 and is used for lubricating the gears and bearings of the deceleration device 21 and the differential device 22 in the gear accommodation portion 302. Further, the other part of the scraped oil CL is stored in a saucer portion 324 to be described later, and then supplied to the hollow portion 1112 of the motor shaft 111 through the hollow portion 2142 of the gear side oil passage 325 and the first shaft 214 to be described later, and used for cooling the stator 12.

The pitch circle diameter of the fourth gear 221 is larger than the pitch circle diameter of the second gear 212. By doing so, the pitch circle diameter of the fourth gear 221 can be made larger, so that the deceleration ratio of the torque transmitted from the motor portion 1 to the fourth gear 221 via the first gear 211, the second gear 212, and the third gear 213 can be made larger. Further, when the oil CL is accumulated in the lower part of the gear accommodation portion 302, it is easy to dispose the fourth gear 221 so that the lower part of the fourth gear 221 is immersed in the oil CL. With this arrangement, the rotation of the fourth gear 221 makes it easier to scrape up the oil CL on the teeth surface of the fourth gear 221.

In the Z axis direction, the differential axis J3 is disposed between the rotation axis J1 and the intermediate axis J2. By disposing the differential axis J3 on the −Z direction side with respect to the rotation axis J1 and on the +Z direction side with respect to the intermediate axis J2, the size of the drive device 100 in the Z axis direction can be made smaller as compared with the configuration in which the differential axis J3 is disposed on the +Z direction side with respect to the rotation axis J1 or on the −Z direction side with respect to the intermediate axis J2. In particular, it is possible to prevent the drive shaft Ds to which the torque is transmitted from the fourth gear 221 that is rotatable around the differential axis J3 from hindering the arrangement of the inverter housing 314 in the Z axis direction. Therefore, the inverter housing 314 can be disposed on the −Z direction side, and the size of the drive device 100 in the Z axis direction can be made smaller. Therefore, the drive device 100 can be further made compact.

The drive shaft Ds on the +Y direction side is mounted on the side gear of the differential device 22 on the +Y direction side. The drive shaft Ds on the −Y direction side is mounted to the side gear of the differential device 22 on the −Y direction side. Each of these drive shafts Ds is rotatably supported by different bearings (not illustrated). These bearings are held in the differential device case 222. The fourth gear 221 is supported by the bearings described above via the differential device case 222, pinion gears, and side gears.

Figure 4:
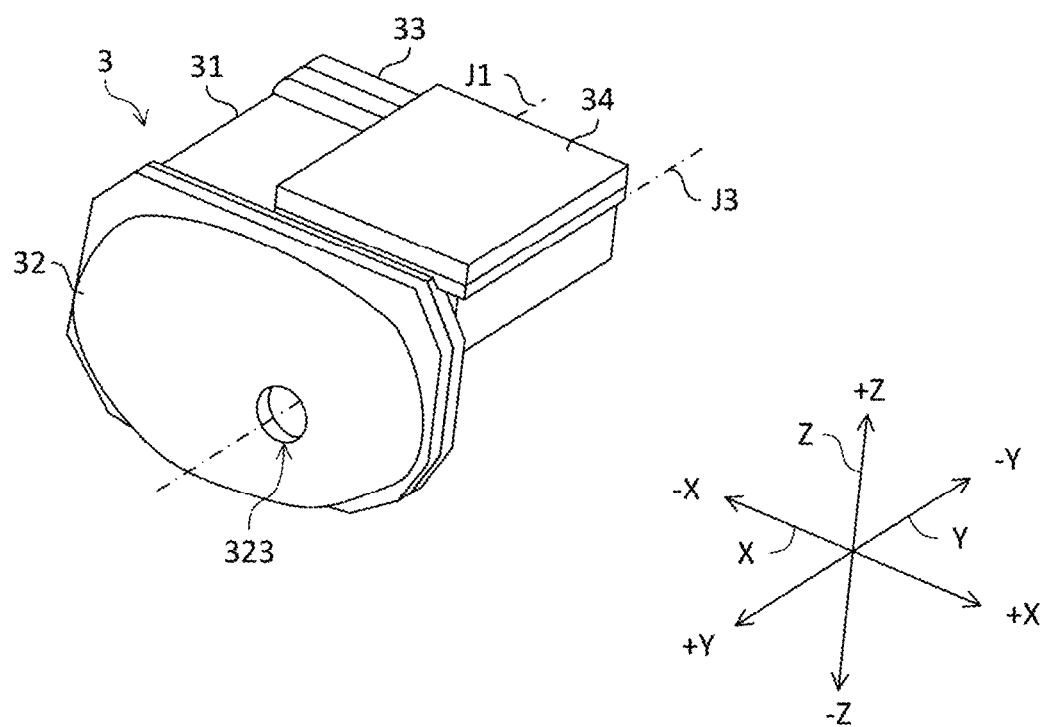
FIG. 4 is a perspective view of a housing.
Figure 5:
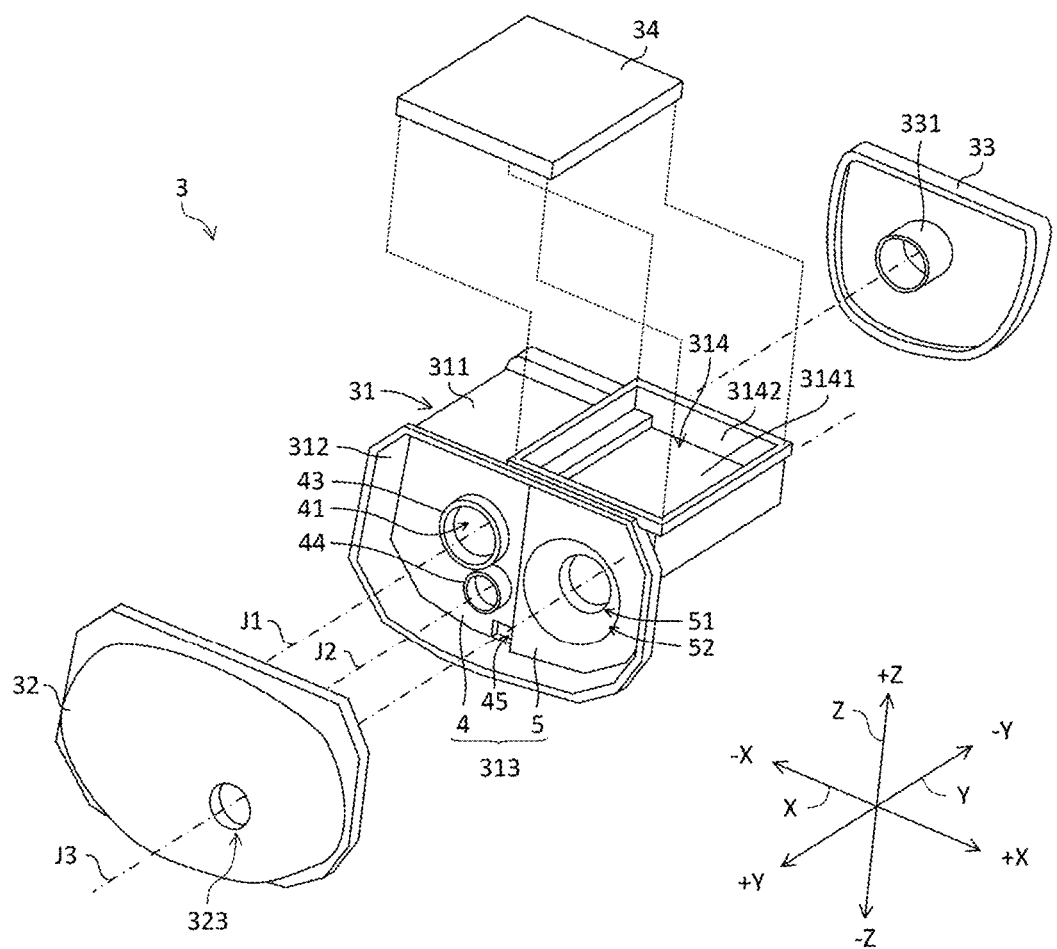
FIG. 5 is an exploded perspective view of the housing.

Next, the configuration of the housing 3 will be described with reference to FIGS. 1, 2, 4, and 5. FIG. 4 is a perspective view of the housing 3. FIG. 5 is an exploded perspective view of the housing 3.

The housing 3 has a housing body 31, a first lid portion 32, a second lid portion 33, and a third lid portion 34. The housing body 31 includes a motor housing 311, a gear housing 312, and an inverter housing 314, which will be described later. The first lid portion 32 is located on the +Y direction side of the housing body 31. The second lid portion 33 is located on the −Y direction side of the housing body 31. The third lid portion 34 is located on the +Z direction side of the housing body 31.

The housing body 31 includes the motor housing 311, the gear housing 312, the partition wall 313, and the inverter housing 314. In other words, the housing 3 includes the motor housing 311 and the gear housing 312. The motor housing 311 has a tubular shape extending in the Y axis direction and accommodates the motor portion 1. The gear housing 312 has a tubular shape extending in the Y axis direction and accommodates the gear portion 2. The gear housing 312 is disposed on the +Y direction side with respect to the motor housing 311. Further, the housing 3 has the partition wall 313 and the inverter housing 314. The partition wall 313 separates the motor housing 311 and the gear housing 312. The inverter housing 314 accommodates the inverter unit 6 that is electrically connected to the stator 12.

In this embodiment, the motor housing 311, the gear housing 312, and the partition wall 313 are integrated. Further, the inverter housing 314 is also integrated with these. By making these different parts of the same member, the number of components of the housing 3 can be reduced. Therefore, the productivity of the drive device 100 can be improved. However, the present invention is not limited to this example, and a part of the motor housing 311, the partition wall 313, the gear housing 312, and the inverter housing 314 may be a member different from the other parts.

The partition wall 313 covers the end portion of the motor housing 311 on the +Y direction side and also covers the end portion of gear housing 312 on the −Y direction side. The partition wall 313 has a first partition wall 4 and a second partition wall 5. The first partition wall 4 extends in a direction intersecting with the Y axis direction and covers the end portion of the motor housing 311 on the +Y axis direction side. The second partition wall 5 extends in a direction intersecting with the Y axis direction, is disposed on the +X direction side with respect to the first partition wall 4, and covers the end portion of the gear housing 312 on the −Y direction side together with the first partition wall 4. The second partition wall 5 is disposed on the +Y direction side with respect to the first partition wall 4.

By disposing the second partition wall 5 on the +Y direction side with respect to the first partition wall 4, a space for disposing the inverter housing 314 on the −Y direction side with respect to the second partition wall 5 can be easily secured. Therefore, the inverter housing 314 can be disposed closer to the differential axis J3 in the X axis direction. Therefore, since the size of the drive device 100 in the X axis direction can be made smaller, the drive device 100 can be disposed more compactly.

Further, in the present embodiment, as described above, the second gear 212 having a pitch circle radius larger than that of the third gear 213 is disposed on the −Y direction side with respect to the third gear 213. Therefore, the fourth gear 221 that meshes with the third gear 213 can be disposed on the +Y direction side. Therefore, the second partition wall 5, which will be described later, can be further disposed on the +Y direction side. Therefore, the inverter housing 314 can be disposed closer to the differential axis J3 in the Z direction. Therefore, the size of the drive device 100 in the X axis direction can be made smaller, and the drive device 100 can be disposed more compactly.

Preferably, at least a part of the second partition wall 5 is disposed on the +Y direction side with respect to the second gear 212. In this way, a wider space for disposing the inverter housing 314 on the −Y direction side with respect to the second partition wall 5 can be secured. However, this example does not exclude the configuration in which the second partition wall 5 is not disposed on the +Y direction side with respect to the second gear 212.

The first partition wall 4 has an insertion hole 41, a first motor bearing holding portion 42, a first gear bearing holding portion 43, a first intermediate bearing holding portion 44, and a partition wall opening 45.

The insertion hole 41 penetrates the first partition wall 4 in the Y axis direction. The center of the insertion hole 41 coincides with the rotation axis J1. The first motor bearing holding portion 42 is disposed on the −Y direction side of the insertion hole 41. The first gear bearing holding portion 43 is disposed on the +Y direction side of the insertion hole 41.

The first motor bearing holding portion 42 and the first gear bearing holding portion 43 are connected through the insertion hole 41.

The first motor bearing holding portion 42 extends in the −Y direction from the outer edge portion of the insertion hole 41 on the −Y direction side when viewed from the Y axis direction. The central axis of the first motor bearing holding portion 42 coincides with the rotation axis J1. The first motor bearing holding portion 42 holds a first motor bearing 421 and rotatably supports the end portion of the motor shaft 111 on the +Y direction side via the first motor bearing 421. The first motor bearing 421 is a ball bearing in this embodiment. An outer ring of the first motor bearing 421 is fixed to the first motor bearing holding portion 42. The inner ring of the first motor bearing 421 is fixed to the radially outer surface of the end portion of the motor shaft 111 on the +Y direction side.

The first gear bearing holding portion 43 extends in the +Y direction from the outer edge portion of the insertion hole 41 on the +Y direction side when viewed from the Y axis direction. The center axis of the first gear bearing holding portion 43 is matched with the rotation axis J1. The first gear bearing holding portion 43 holds a first gear bearing 431 and rotatably supports the end portion of the first shaft 214 on the −Y direction side via the first gear bearing 431. In the present embodiment, the first gear bearing 431 is a ball bearing. An outer ring of the first gear bearing 431 is fixed to the first gear bearing holding portion 43. The inner ring of the first gear bearing 431 is fixed to the radially outer surface of the end portion of the first shaft 214 on the −Y direction side.

The first intermediate bearing holding portion 44 is disposed on the +Y direction side of the first partition wall 4. The center axis of the first intermediate bearing holding portion 44 is matched with the intermediate axis J2. The first intermediate bearing holding portion 44 is disposed on the −Z direction side with respect to the rotation axis J1 and the differential axis J3. The first intermediate bearing holding portion 44 holds a first intermediate bearing 441 and rotatably supports the end portion of the second shaft 215 on the −Y direction side via the first intermediate bearing 441. In the present embodiment, the first intermediate bearing 441 is a ball bearing. The outer ring of the first intermediate bearing 441 is fixed to the first intermediate bearing holding portion 44. Further, the inner ring of the first intermediate bearing 441 is fixed to the radially outer surface of the end portion of the second shaft 215 on the −Y direction side.

The partition wall opening 45 is disposed at the lower part in the vertical direction (that is, the −Z direction side) of the first partition wall 4. The partition wall opening 45 penetrates the first partition wall 4 in the Y axis direction, connects the motor accommodation portion 301 to the gear accommodation portion 302, and particularly communicates these lower portions in the vertical direction. The partition wall opening 45 allows the oil CL accumulated in the lower portion in the motor accommodation portion 301 to move to the gear accommodation portion 302. The oil CL having moved to the gear accommodation portion 302 can flow into the oil pool P.

Next, the second partition wall 5 has a first drive shaft passing hole 51. The first drive shaft passing hole 51 penetrates the second partition wall 5 in the Y axis direction. The drive shaft Ds attached to the differential device 22 on the −Y direction side penetrates through the first drive shaft passing hole 51 in a rotatable state. An oil seal (not illustrated) is provided between the drive shaft Ds and the first drive shaft passing hole 51 in order to suppress leaking of oil CL.

The second partition wall 5 further has a differential device accommodation portion 52. The differential device accommodation portion 52 is recessed in the −Y direction to accommodate a part of the differential device 22. By accommodating a part of the differential device 22 by the differential device accommodation portion 52, the gap between the fourth gear 221 and the second partition wall 5 in the Y axis direction can be further narrowed. Therefore, the size of the drive device 100 in the Y axis direction can be made smaller.

At least a part of the differential device accommodation portion 52 is located on the −Z direction side with respect to the inverter housing 314. In this way, the differential device accommodation portion 52 can be prevented from interfering with the arrangement of the inverter housing 314 in the Z axis direction.

The inverter housing 314 has a bottom plate 3141 and a peripheral wall 3142. The bottom plate 3141 extends in the +X direction from the outer surface of the motor housing 311. The peripheral wall 3142 projects in the +Z direction from the outer edge portion of the bottom plate 3141 seen from the Z axis direction, and surrounds the bottom plate 3141 when viewed from the Z axis direction. The inverter housing 314 constitutes the inverter accommodation portion 303 together with the third lid portion 34.

The bottom plate 3141 is disposed on the +X direction side with respect to the second shaft 215. In this way, in the X axis direction, for example, the second shaft 215 is unlikely to interfere with the arrangement of the inverter housing 314.

The portion of the peripheral wall 3142 on the +Y direction side includes the end portion of the second partition wall 5 on the +Z direction side. In this way, it is possible to secure a space in which at least a part of the inverter housing 314 is disposed on the −Z direction side with respect to the second partition wall 5.

Next, the first lid portion 32 is attached to the end portion of the gear housing 312 on the +Y direction side, and closes the end portion of the gear housing 312 on the +Y direction side. The shape of the first lid portion 32 is a concave shape that opens in the −Y direction. The first lid portion 32 constitutes the gear accommodation portion 302 together with the gear housing 312 and the partition wall 313. The first lid portion 32 includes a second gear bearing holding portion 321, a second intermediate bearing holding portion 322, a second drive shaft passing hole 323, a saucer portion 324, a gear side oil passage 325, and a gear side limiting member 326.

The second gear bearing holding portion 321 is disposed on the −Y direction side of the first lid portion 32. The center axis of the second gear bearing holding portion 321 is matched with the rotation axis J1. The second gear bearing holding portion 321 holds the second gear bearing 3211 and rotatably supports the end portion of the first shaft 214 on the +Y direction side via the second gear bearing 3211. In the present embodiment, the second gear bearing 3211 is a ball bearing. An outer ring of the second gear bearing 3211 is fixed to the second gear bearing holding portion 321. The inner ring of the second gear bearing 3211 is fixed to the radially outer surface of end portion of the first shaft 214 on the +Y direction side.

The second intermediate bearing holding portion 322 is disposed on the −Y direction side of the first lid portion 32. The center axis of the second intermediate bearing holding portion 322 is matched with the intermediate axis J2. The second intermediate bearing holding portion 322 is disposed on the −Z direction side with respect to the rotation axis J1 and the differential axis J3. The second intermediate bearing holding portion 322 holds a second intermediate bearing 3221 and rotatably supports the end portion of the second shaft 215 on the +Y direction side via the second intermediate bearing 3221. In the present embodiment, the second intermediate bearing 3221 is a ball bearing. An outer ring of the second intermediate bearing 3221 is fixed to the second intermediate bearing holding portion 322. Further, the inner ring of the second intermediate bearing 3221 is fixed to the radially outer surface of the end portion of the second shaft 215 on the +Y direction side.

The second drive shaft passing hole 323 penetrates the first lid portion 32 in the axial direction. The second drive shaft passing hole 323 overlaps with the first drive shaft passing hole 51 when viewed from the Y axis direction. The drive shaft Ds attached to the +Y direction side of the differential device 22 penetrates through the second drive shaft passing hole 323 in a rotatable state. An oil seal (not illustrated) is provided between the drive shaft Ds and the second drive shaft passing hole 323 in order to suppress leaking of oil CL.

The saucer portion 324 is disposed radially outward with respect to the differential axis J3 with respect to the fourth gear 221 and opens in the +Z direction (that is, vertically upward). The oil CL scraped up by the fourth gear 221 is stored in the saucer portion 324. The saucer portion 324 extends in the +Y direction from the partition wall 313. The end portion of the saucer portion 324 on the +Y direction side is connected to the inner surface of the first lid portion 32 facing the −Y direction. The saucer portion 324 has a supply hole 3241. A part of the oil CL accumulated in the saucer portion 324 is supplied to the first gear bearing 431, the second gear bearing 3211, the first intermediate bearing 441, and the second intermediate bearing 3221 to lubricate and cool them, and also is supplied to the first gear 211, the second gear 212, and the third gear 213 to lubricate these teeth surfaces. As described above, the oil CL used for lubricating and cooling each gear and bearing of the gear portion 2 returns to the oil pool P.

The gear side oil passage 325 is formed inside the first lid portion 32. The gear side oil passage 325 is a flow path of the oil CL connecting the end portion of the saucer portion 324 on the +Y direction side to the second gear bearing holding portion 321. Further, one end of the gear side oil passage 325 is connected to the end portion of the saucer portion 324 on the +Y direction side and is connected to the saucer portion 324. The other end of the gear side oil passage 325 is connected to the second gear bearing holding portion 321. The oil CL stored in the saucer portion 324 is supplied to the gear side oil passage 325. As illustrated in FIG. 2, a part of the oil CL supplied to the gear side oil passage 325 is supplied to the second gear bearing 3211. Further, the other part of the oil CL supplied to the gear side oil passage 325 flows into the hollow portion 2142 from the end portion of the first shaft 214 on the +Y direction side and flows in the −Y direction, and flows in the −Y direction, and flows into the hollow portion 1112 of the motor shaft 111.

The gear side limiting member 326 limits the amount of the oil CL supplied from the gear side oil passage 325 to the second gear bearing 3211. Due to this limitation, the oil CL supplied from the gear side oil passage 325 to the hollow portion 1112 of the motor shaft 111 through the hollow portion 2142 of the first shaft 214 can be secured. The gear side limiting member 326 includes an annular portion (reference numeral omitted) facing the second gear bearing 3211 in the Y axis direction and a tubular portion (reference numeral omitted) which extends from the end portion of the annular portion in the −Y direction to be inserted into the first shaft 214. The annular portion has a through hole (reference numeral omitted) that penetrates the annular portion in the Y axis direction. The oil CL is supplied to the second gear bearing 3211 through the through hole and is supplied to the inside of the first shaft 214 through the tubular portion.

The second lid portion 33 is attached to the end portion of the motor housing 311 on the −Y direction side, and closes and blocks the end portion of the motor housing 311 on the −Y direction side. The second lid portion 33 constitutes the motor accommodation portion 301 together with the motor housing 311 and the partition wall 313.

The second lid portion 33 has a second motor bearing holding portion 331. The second motor bearing holding portion 331 is disposed on the +Y direction side of the second lid portion 33. The central axis of the second motor bearing holding portion 331 coincides with the rotation axis J1. The second motor bearing holding portion 331 holds a second motor bearing 3311 and rotatably supports the end portion of the motor shaft 111 on the −Y direction side via the second motor bearing 3311. The second motor bearing 3311 is a ball bearing in this embodiment. The outer ring of the second motor bearing 3311 is fixed to the second motor bearing holding portion 331. Further, the inner ring of the second motor bearing 3311 is fixed to the radially outer surface of the end portion of the motor shaft 111 on the −Y direction side.

Further, the housing 3 further has the third lid portion 34. The third lid portion 34 is disposed on the +Z direction side with respect to the motor housing 311. The third lid portion 34 is attached to the upper part of the housing body 31. The third lid portion 34 constitutes the inverter accommodation portion 303 together with the inverter housing 314.

Next, the pump 7 and the oil cooler 8 will be described with reference to FIGS. 1 and 2.

The pump 7 is an electric pump driven by electricity, and is connected to the inverter unit 6 via a harness cable (not illustrated). That is, the pump 7 is driven by the inverter unit 6. As the pump 7, a trochoidal pump, a centrifugal pump, or the like can be employed. The pump 7 sucks up the oil CL from the oil pool P and supplies it to an oil supply portion 72 to be described later via the oil cooler 8.

The oil cooler 8 exchanges heat between the oil CL sent from the pump 7 and a refrigerant RE supplied in a system different from a motor side oil passage 71 to be described later. Thus, the oil cooler 8 cools the oil CL sent from the pump 7. The pump 7 and the oil cooler 8 are fixed to the housing body 31 with bolts (not illustrated).

The oil CL circulates in the motor side oil passage 71 provided in the housing 3. The motor side oil passage 71 is a flow path of the oil CL which supplies the oil CL from the oil pool P to the motor portion 1. The motor side oil passage 71 circulates the oil CL and cools the motor portion 1. The oil CL is used as a lubricating liquid for lubricating the gear portion 2. Further, the oil CL is also used as a refrigerant for cooling the motor portion 1 and the gear portion 2. The oil CL is stored in the oil pool P at the bottom of the gear housing 312. An oil equivalent to a lubricating oil (ATF: Automatic Transmission Fluid) for an automatic transmission having a low viscosity is preferably used as the oil CL so that the oil can perform functions of a lubricating oil and a refrigerant.

The motor side oil passage 71 is a flow path of the oil CL from the oil pool P to the oil supply portion 72. The oil supply portion 72 supplies the oil CL to the stator 12. The drive device 100 further includes the oil supply portion 72. In the present embodiment, the oil supply portion 72 has a tubular shape extending in the axial direction, is housed in the motor accommodation portion 301, and is disposed radially outward from the stator 12. The oil supply portion 72 has a supply hole 721. The supply hole 721 penetrates the oil supply portion 72 in the radial direction. A part of the oil CL flowing inside the oil supply portion 72 is supplied to the end portion of the stator 12 in the Y axis direction and the radially outer surface through the supply hole 721. The other part of this oil CL is supplied to the first motor bearing 421 and the second motor bearing 3311 through the supply hole 721 to lubricate and cool them. The oil CL used for lubricating and cooling the stator 12, the first motor bearing 421, and the second motor bearing 3311 is collected in the lower part of the motor accommodation portion 301, and then passes through the partition wall opening 45 to return to the oil pool P of the bottom of the gear accommodation portion 302.

The embodiments of the present invention are described above. Note that, the scope of the present invention is not limited to the above-described embodiments. The present invention can be implemented by making various modifications to the above-described embodiment without departing from the gist of the invention. In addition, the matters described in the above-described embodiment can be discretionarily combined together as appropriate within a range where no inconsistency occurs.

The present invention is useful for a drive motor for a vehicle such as a hybrid vehicle (HV), a plug-in hybrid vehicle (PHV), and an electric vehicle (EV).

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device comprising:
   a motor portion including a rotor having a motor shaft rotatable about a first rotation axis extending in an axial direction, and a stator disposed radially outward from the rotor;
   a gear portion located at one end portion in the axial direction of the motor portion; and
   a housing for accommodating the motor portion and the gear portion, wherein the gear portion includes:
   a first shaft connected to the motor shaft;
   a first gear located on a radially outer surface of the first shaft;
      a second shaft extending along a second rotation axis extending in the axial direction,
      a second gear and a third gear, which are located on the radially outer surface of the second shaft extending in the axial direction, and are rotatable around the second rotation axis; and
      a fourth gear that is rotatable around a third rotation axis extending in the axial direction,
   the second gear is disposed on an other side of the third gear in the axial direction and meshes with the first gear,
   the third gear meshes with the fourth gear,
   a pitch circle diameter of the second gear is larger than a pitch circle diameter of the third gear,
   the third rotation axis is disposed on one side in a first direction perpendicular to the axial direction with respect to the first rotation axis,
   the housing includes:
      a motor housing that has a tubular shape extending in the axial direction and accommodates the motor portion;
      a gear housing that has a tubular shape extending in the axial direction and accommodates the gear portion;
      a partition wall that separates the motor housing and the gear housing; and
      an inverter housing that accommodates an inverter unit electrically connected to the stator, the inverter housing includes:
      a bottom plate extending from an outer surface of the motor housing to one side in the first direction, wherein the bottom plate is disposed on an other side in the second direction with respect to the second shaft; and
      a peripheral wall that protrudes from an outer edge portion of the bottom plate when viewed from the second direction to an other side in the second direction and surrounds the bottom plate when viewed from the second direction,
   the fourth gear is disposed on one side in the axial direction with respect to the inverter housing,
   the first rotation axis is disposed on an other side in the first direction with respect to the inverter housing,
   the third rotation axis is disposed on one side in a second direction perpendicular to the axial direction and the first direction with respect to the inverter housing,
   the partition wall includes:
      a first partition wall that spreads in a direction intersecting with the axial direction and covers one end portion of the motor housing in the axial direction; and
      a second partition wall that extends in a direction intersecting with the axial direction, is disposed on one side of the first partition wall in the first direction, and covers an other end portion of the gear housing in the axial direction together with the first partition wall, and
   the second partition wall is disposed on one side of the first partition wall in the axial direction.

2. The drive device according to claim 1, wherein the housing includes:
   a housing body including the motor housing, the gear housing, and the inverter housing;
   a first lid portion located on one side of the housing body in the axial direction;
   a second lid portion located on an other side of the housing body in the axial direction; and
   a third lid portion located on an other side of the housing body in the second direction, and
   the motor housing, the gear housing, and the inverter housing are integrated with each other.

3. The drive device according to claim 1, wherein the second rotation axis is disposed on one side in the second direction with respect to the first rotation axis.

4. The drive device according to claim 1, wherein in the second direction, the third rotation axis is disposed between the first rotation axis and the second rotation axis.

5. The drive device according to claim 1, wherein
a portion of the peripheral wall on one side in the axial direction includes an other end portion of the second partition wall in the second direction.

6. The drive device according to claim 1, wherein at least a part of the second partition wall is disposed on one side in the axial direction with respect to the second gear.

7. The drive device according to claim 1, wherein a pitch circle diameter of the fourth gear is larger than a pitch circle diameter of the second gear.

8. The drive device according to claim 1, wherein
the gear portion includes a drive shaft and a differential device,
the drive shaft extends axially from the differential device in the axial direction,
the fourth gear is a ring gear of the differential device,
the differential device transmits torque of the fourth gear to the drive shaft, and
the drive shaft is located on one side in the second direction with respect to the inverter housing.

9. The drive device according to claim 8, wherein
the fourth gear has a plurality of teeth disposed in a radially outer end portion of the fourth gear and arranged in a circumferential direction, and
in the axial direction, a gap between an other end portion of the teeth of the fourth gear in the axial direction and an other end portion of the differential device in the axial direction is wider than a gap between one end portion of the teeth in the axial direction and one end portion of the differential device in the axial direction.

10. The drive device according to claim 8, wherein the second partition wall has a differential device accommodation portion recessed in an other side in the axial direction to accommodate a part of the differential device.

11. The drive device according to claim 10, wherein at least a part of the differential device accommodation portion is located on one side in the second direction with respect to the inverter housing.

12. The drive device according to claim 8, wherein at least a part of the second gear is overlapped with the differential device when viewed from the first direction.

* * * * *